United States Patent
Brooks

(10) Patent No.: US 7,849,037 B2
(45) Date of Patent: Dec. 7, 2010

(54) METHOD FOR USING THE FUNDAMENTAL HOMOTOPY GROUP IN ASSESSING THE SIMILARITY OF SETS OF DATA

(76) Inventor: Roger K. Brooks, 690 Wildwood La., Palo Alto, CA (US) 94303

( * ) Notice: Subject to any disclaimer, the term of this patent is extended or adjusted under 35 U.S.C. 154(b) by 688 days.

(21) Appl. No.: 11/869,699

(22) Filed: Oct. 9, 2007

(65) Prior Publication Data

US 2008/0140741 A1    Jun. 12, 2008

Related U.S. Application Data

(60) Provisional application No. 60/828,733, filed on Oct. 9, 2006.

(51) Int. Cl.
*G06F 17/00* (2006.01)

(52) U.S. Cl. ...................................... 706/45

(58) Field of Classification Search ............. 706/45–46, 706/62; 707/692, 758, 749; 708/201
See application file for complete search history.

(56) References Cited

U.S. PATENT DOCUMENTS

| | | | | |
|---|---|---|---|---|
| 5,442,716 A | * | 8/1995 | Otsu et al. ................... 382/181 |
| 5,933,823 A | * | 8/1999 | Cullen et al. ...................... 1/1 |
| 5,956,404 A | * | 9/1999 | Schneier et al. ............. 713/180 |
| 6,096,961 A | * | 8/2000 | Bruti et al. ..................... 84/609 |
| 7,031,980 B2 | * | 4/2006 | Logan et al. ...................... 1/1 |
| 7,725,724 B2 | * | 5/2010 | Ding et al. ................... 713/176 |
| 2007/0198459 A1 | * | 8/2007 | Boone et al. ................... 707/1 |
| 2008/0140741 A1 | * | 6/2008 | Brooks ........................ 708/201 |
| 2008/0162421 A1 | * | 7/2008 | Brooks ........................... 707/2 |
| 2008/0162422 A1 | * | 7/2008 | Brooks ........................... 707/2 |
| 2008/0215529 A1 | * | 9/2008 | Brooks ........................... 707/2 |
| 2008/0215530 A1 | * | 9/2008 | Brooks ........................... 707/2 |
| 2008/0215566 A1 | * | 9/2008 | Brooks ........................... 707/5 |

* cited by examiner

*Primary Examiner*—David R Vincent

(57) ABSTRACT

A method for finding sequences of similar data (SDDs), which are similar to a target sequence of digital data, is invented. The method leverages a new category of signatures, called equivalence signatures, to characterize the SDDs. These signatures have the salient feature that, at worst, they change in a bounded manner when changes are made to the sequence of digital data and when used to find SDDs that are similar to a target SDD, they allow for a significant reduction in the number of SDDs to be compared with the target. This is an improvement over the state of the art wherein the cryptographic message digests used as signatures respond unpredictably to changes in the sequence of digital data and the comparison of a target SDD to a corpus of SDDs requires the computational expensive process of applying a complete search against the entire corpus.

20 Claims, 5 Drawing Sheets

METHOD FOR USING THE FUNDAMENTAL HOMOTOPY GROUP IN ASSESSING THE SIMILARITY OF SETS OF DATA

CROSS-REFERENCE TO RELATED APPLICATIONS

This application claims the benefit of PPA Ser. No. 60/828,733, filed Oct. 9, 2006 by the present inventor and PPA Ser. No. 60/883,0013, filed Dec. 31, 2006 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to the identification and retrieval of sequences of digital data (SDDs) by a computing device.

2. Prior Art

A method for the discovery of SDDs that are similar to a target SDD is invented here. Formulae from algebraic topology [Spanier] are used to compute signatures that characterize equivalence classes of SDDs. The method leverages these "equivalence signatures" to find SDDs that are similar to target SDDs and, separately and alternatively, find SDDs that are dissimilar from the target SDDs.

The definition of "similarity", and thus the features and method used to compute it, is idiosyncratic to the retrieval application [O'Connor]. As an example of a state of the art method to detect similar music, a recent invention uses subjective meta-data in the retrieval of music as its features U.S. Pat. No. 7,022,905 while another U.S. Pat. No. 7,031,980 uses k-means clustering and beat signatures as its features. A third invention U.S. Pat. No. 7,246,314, uses closeness to a Gaussian model as a similarity measure for identifying similar videos. Yet another example U.S. Pat. No. 7,010,515 compares histograms of text elements to determine the similarity of bodies of text. In the case of image retrieval [Gonzalez], methods using entropy, moments, etc. as signatures, have been invented U.S. Pat. Nos. 5,933,823; 5,442,716. Work in computer graphics has advanced these analytical methods by using an elementary result from topology, the Euler number of polyhedra, as a descriptor of boundary polygons of graphics objects [Foley]. Recently, a method for computing the Euler numbers of binary images using a chip design has been invented U.S. Pat. No. 7,027,649.

The cost of implementing these methods is typically proportional to the product of the number of SDDs in the database with the cost of computing the distance between the target SDD and another SDD. The latter often involves the computation of the projection angle between two vectors that represent the features (e.g., histogram of the text elements) of the SDDs. For large databases, this process can be both resource and time expensive. A two step method is required wherein the number of candidates for similarity is significantly reduced in a computationally inexpensive first step and then the traditional features can be applied to the reduced set of candidates.

Intuitively, if two SDDs are similar, then they should be deformable into each other without having to remove or glue together portions of SDDs. For example, in audio applications, if the amplitudes of two subsequences are rescalings of each other or if the phases of the subsequences are shifts of each other, then the subsequences are similar. The field of topology provides a foundation for solving this problem. In particular, we appeal to homotopy invariants that characterize equivalence classes of maps between topological spaces [Bott].

We interpret each SDD as a sampling of maps from an interval of the real line (the world space) to the n-dimensional topological space and seek homotopy equivalence classes of such maps. Following standard techniques, such as adding an extra point to the end of the interval and identifying the value of the map at that point with its value at the first point of the interval, we turn the interval into a circle. As SDDs typically contain defined subsequences (e.g., natural language words or phrases, file section markers, etc.) we take the normalized form of the digital data for each subsequence to be the values of the exponent, $\phi_{(i)}$, in the exponential map $e^{i\phi(i)}:S^1 \to S^1$ for the $i^{th}$ subsequence. We then compute the Fundamental Group, $\pi_1(S^1)$, for each map. If two subsequences of digital data do not have the same value of $\pi_1(S^1)$, then they cannot be continuously deformed into each other and are thus not similar. If none of the subsequences of two SDDs are similar to each other, then those subsequences are not similar to each other.

The calculation of the equivalence signature consists of two steps. In the first step, the value of $\pi_1(S^1)$ for each subsequence of digital data is computed as [Schwarz]

$$S_{\pi_1}[\varphi_{(i)}] = \frac{1}{2\pi}\int_0^{2\pi} d\theta \frac{d\varphi_{(i)}}{d\theta}, \qquad \text{Eqn. 1}$$

where the world space coordinate, $\sigma$, of each data element in the subsequence of digital data is used to define the angle on the circle by $$\theta = \frac{2\pi\sigma}{L},$$

where L is the number of elements in the SDD.

Next, we use the value of $\pi_1(S^1)$, for each of the $N_s$ subsequences of the digital data to compute the equivalence signature, $\xi[\phi]$, for the entire SDD as:

$$\xi[\varphi] \equiv \sum_{i=1}^{N_s} \xi_i[\varphi_{(i)}], \qquad \text{Eqn. 2}$$

$$\xi_i[\varphi_{(i)}] \equiv e^{-i\pi S_{\pi_1}[\varphi_{(i)}]}.$$

Consider two SDDs, $\phi$, and $\phi'$, partitioned as $\{\phi_{(i)}\}$ and $\{\phi'_{(i)}\}$, respectively. By construction, if a subsequence of digital data, $\phi_{(i)}$, is similar to another subsequence of digital data, $\phi'_{(i)}$, by the addition of a third SDD, $\alpha_{(i)}$, so that $$\phi_{(i)} \to \phi'_{(i)} = \phi_i + \alpha_{(i)}, \qquad \text{Eqn. 3}$$

then as long as the values of the $\alpha_{(i)}$ at the endpoints are the same for each partition, then the difference in the values of the equivalence signatures will be the same: $\xi[\phi']=\xi[\phi]$. If on the other hand, the values of the $\alpha_{(i)}$ at the endpoints are not the same for each partition, then the difference in the values of the the equivalence signatures is bounded by the number, $N_\delta$, of subsequences that are different:

$$-N_\delta \leq (\xi[\phi'] - \xi[\phi]) \leq N_\delta.$$  Eqn. 4

As an example for the reduction factor for the number of CPU cycles and other resources required to find similar SDDs in a corpus, assume for simplicity that $N_\delta = 0$ and that the equivalences signatures of the SDDs in the corpus are uniformly distributed over their possible values. Then the reduction in the number of secondary features to be compared is $$\left(\frac{1}{N_S + 1}\right).$$

Thus for a corpus of text documents with ten words per sentence on the average, wherein we are interested in finding a text documents that contain the words that are in a target sentence, irrespective of the ordering of the words, we will have roughly a factor of ten reduction in the number of secondary feature comparisons as compared to the state of the art. In particular, without the use of the method invented here

- in the case where a term vector is used as the characteristic feature of each SDD, the term vector of the target would have to be compared to all term vectors computed for the SDDs in the corpus, or
- in the case where a cryptographic hash is used as the characteristic feature of each SDD, there would be a hash for each of the possible $N_s!$ orderings of the words in the target SDD and a check for the equality of each of these hashes with the hash of each SDD in the corpus, would have to be done.

In this case, the method invented here reduces the number of executions of these computations by the aforementioned factor.

OBJECTS AND ADVANTAGES

The objects of the current invention include the:
1. computation of an equivalence signature for each SDD such that SDDs that do not have the same equivalence signature will not be similar,
2. universal realization of these signatures for all types of data (e.g., text, images, audio, video, binaries) that can be represented as a stream of bits,
3. population of a database with the equivalence signatures, secondary features and other meta data about the SDD,
4. use of the equivalence signatures for the identification of those SDDs that are not similar to a target SDD,
5. use of equivalence signatures for the identification of those candidate SDDs that may be similar to a target SDD,
6. use of the secondary features and other meta data for the candidate similar SDDs in further analysis, such as feature comparison, to determine the final set of similar SDDs, and
7. retrieval of the files containing the similar SDDs by means of the meta data stored in the database.

The advantages of the current invention include:
1. signatures for SDDs that, unlike cryptographic hashes, do not change chaotically in response to small changes in those sequences,
2. a method for computing these signatures for all types of data, including text and video,
3. a quantifiable means for measuring similarity that is a bounded function of the number of different subsequences of digital data, and
4. the computational and resource expense of using feature comparison methods to determine the similarity of SDDs is reduced, by factor that is on the order of the average number of subsequences in the SDDs, by using the determination of candidates for similar SDDs, invented here, as a precursor to secondary feature comparison.

SUMMARY

In accordance with the present invention, a method for determining the similarity of sets of data use the Fundamental Homotopy Group to compute an equivalence signature for each sequence of digital data (SDD), and further uses the differences of the equivalence signatures of any two sequences of digital data as the measure of the similarity distance between said sequences of digital data. The output from this method can be used to significantly reduce the computational expense, time and resources required by a subsequent secondary feature comparison.

DRAWINGS—FIGURES

In the drawings, closely related figures have the same numerically close numbers.

DETAILED DESCRIPTION—PREFERRED EMBODIMENT—FIGS. 1-5

A preferred embodiment of the method of the present invention is illustrated in FIGS. 1-5.

A SDD is represented as a set of integers (realized in a computing device as a set number of bits). Each sequence may be realized as a concatenation of subsequences. For example, in some natural languages, a sequence of text is composed of a set of words represented in Unicode and joined by a combination of spaces and punctuation marks; each word or a collection of words can be used as a subsequence.

To determine the similarity, or separately and alternatively non-similarity, of one or a plurality of SDDs with a plurality of SDDs, each SDD may be numerically characterized. For example, each SDD of a database of SDDs may be assigned an equivalence signature that has the property that small changes to the SDD, which maintain similarity with the original SDD, will not significantly change the equivalence signature.

As specified by Eqn. 1 and Eqn. 2, the equivalence signature is the path integral wherein the action functional is proportional to the Fundamental Homotopy Group and the measure for the path integral has support only on the subsequences of the digital data. Upon computation, the equivalence signature reduces to an sum over the subsequences of the number of subsequences that fall into a particular Homotopy class with the sign of that number being positive (negative) if the Homotopy class is even (odd).

Once an equivalence signature is assigned to a SDD, then a plurality of SDDs that are deformations of the former SDD will have equivalence signatures that are within a bounded range of the equivalence signature of the former SDD as given by Eqn. 4. Consequently, SDDs that are candidates for similarity with a target SDD can be identified, in a database, by requiring that the absolute value of the difference between the values of their equivalence signatures and that of the target be no more that the maximum number of different subsequences allowed by the user's definition of similarity. Alternatively, SDDs that are not similar to a target SDD can be identified, in a database, by requiring that the absolute value of the difference between the values of their equivalence signatures and that of the target be more that the maximum number of different subsequences allowed by the user's definition of similarity.

Operation—Preferred Embodiment—FIGS. 1-5

Figure 1:
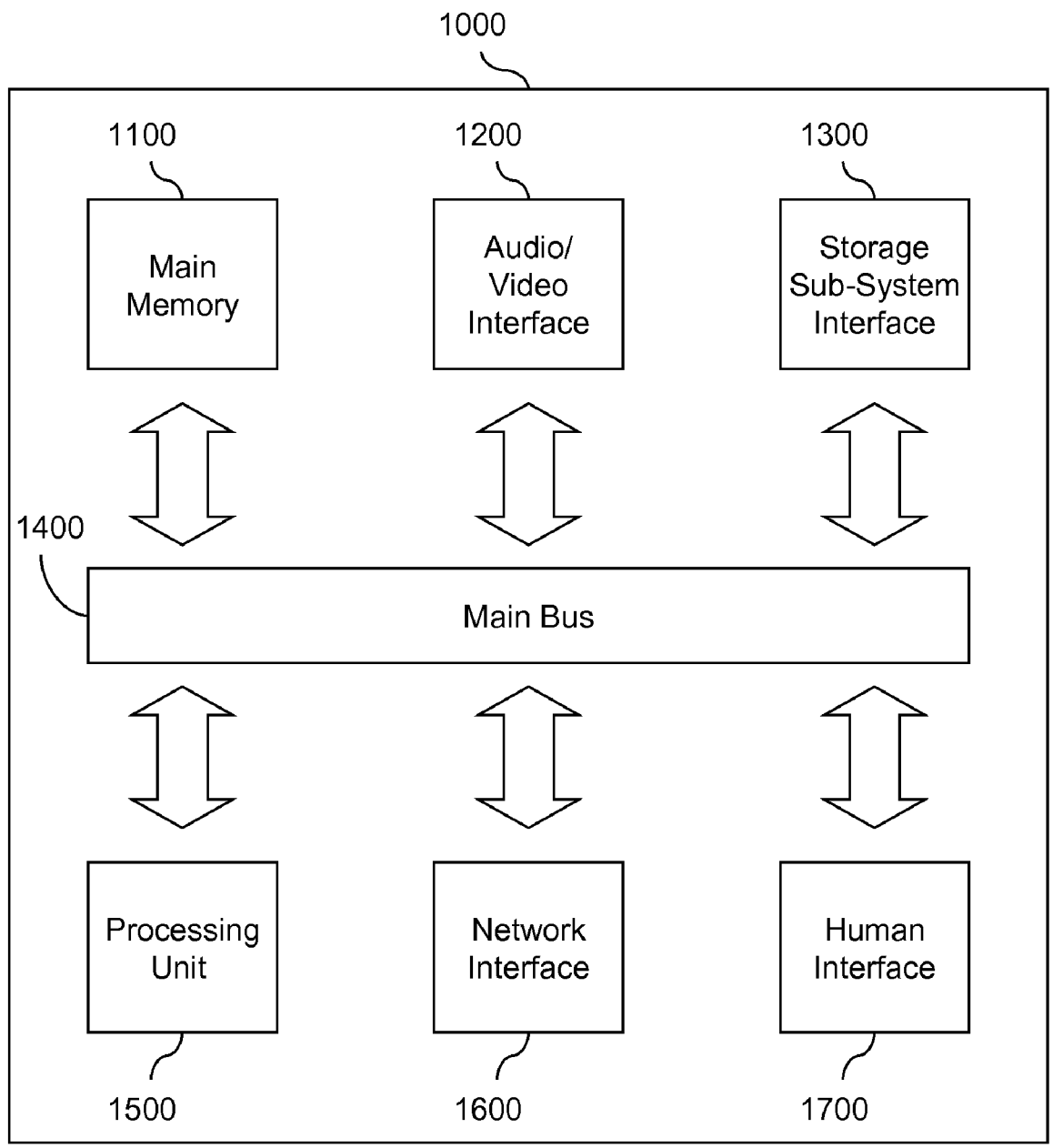
FIG. 1 is a block diagram of a computing device for calculating the equivalence signature of a plurality of SDDs (targets) and finding previously analyzed SDDs that are similar to (or separately and alternatively not similar to) the target (s), according to one embodiment.

In FIG. 1, an illustration of a typical computing device 1000 is configured according to the preferred embodiment of the present invention. This diagram is just an example, which should not unduly limit the scope of the claims of this invention. Anyone skilled in the art could recognize many other variations, modifications, and alternatives. Computing device 1000 typically consists of a number of components including Main Memory 1100, zero or more external audio and/or video interfaces 1200, one or more interfaces 1300 to one or more storage devices, a bus 1400, a processing unit 1500, one or more network interfaces 1600, a human interface subsystem 1700 enabling a human operator to interact with the computing device, and the like.

The Main Memory 1100 typically consists of random access memory (RAM) embodied as integrated circuit chips and is used for temporarily storing the SDDs, configuration data, database records and intermediate and final results processed and produced by the instructions implementing the method invented here as well as the instructions implementing the method, the operating system and the functions of other components in the computing device 1000.

Zero or more external audio and/or video interfaces 1200 convert digital and/or analog A/V signals from external A/V sources into digital formats that can be reduced to PCM/YUV values and the like. Sequences of the later form the SDDs that can be processed by the instructions embodying the method of this invention.

Storage sub-system interface 1300 manages the exchange of data between the computing device 1000 and one or more internal and/or one or more external storage devices such as hard drives which function as tangible media for storage of the data processed by the instructions embodying the method of this invention as well as the computer program files containing those instructions, and the instructions of other computer programs directly or indirectly executed by the instructions, embodying the method of this invention.

The bus 1400 embodies a channel over which data is communicated between the components of the computing device 1000.

The processing unit 1500 is typically one or more chips such as a CPU or ASICs, that execute instructions including those instructions embodying the method of this invention.

The network interface 1600 typically consists of one or more wired or wireless hardware devices and software drivers such as NIC cards, 802.11x cards, Bluetooth interfaces and the like, for communication over a network to other computing devices.

The human interface subsystem 1700 typically consists of a graphical input device, a monitor and a keyboard allowing the user to select files that contain SDDs that are to be analyzed by the method.

Figure 2:
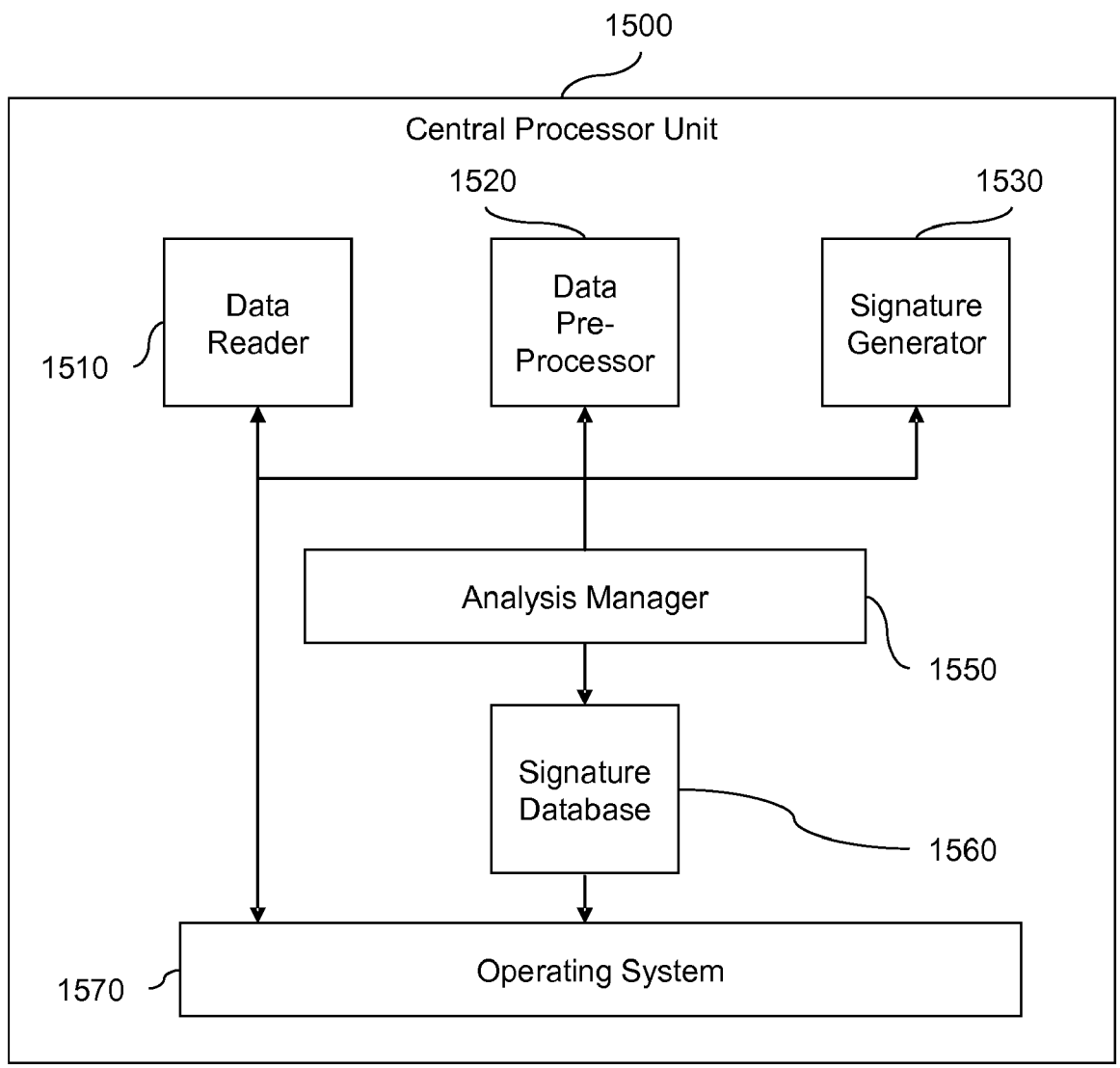
FIG. 2 is a block diagram of the modules and their interconnections, executed by the processing unit of the computing device in FIG. 1, in computing the equivalence signature of and determining the similarity of a plurality of SDDs to other SDDs, according to one embodiment.

In FIG. 2, an illustration is given of the modules executing the method of the present invention on the processing unit 1500.

An equivalence signature is computed as in, 1500, for a SDD under the control of the Analysis Manager. First, the Analysis Manager 1550 instructs the Data Reader 1510 to read the SDD and return control to the Analysis Manager 1550 upon completion. Secondly, when control is returned by the Data Reader 1510, the Analysis Manager 1550 instructs the Data Preprocessor 1520 to process the output from the Data Reader 1510 and return control to the Analysis Manager 1550 upon completion. Third, when control is returned by the Data Preprocessor 1520, the Analysis Manager 1550 instructs the Signature Generator 1530 to process the output from the Data Preprocessor 1520 and return control to the Analysis Manager 1550 upon completion. Fourth, when control is returned by the Signature Generator 1530, the Analysis Manager instructs the Signature Database 1560 to record the output from the Signature Generator 1530, said Signature Database may write the output to a file by means of calls to the Operating System 1570, and return control to the Analysis Manager 1550 upon completion. The Analysis Manager 1550 then waits for the next request.

The Data Reader module 1510 reads the SDD from its storage medium such as a file on a hard drive interfaced to the bus of the computing device or from a networked storage device or server using TCP/IP or UDP/IP based protocols, and the like.

The Data Preprocessor module 1520 finds the start and end of each subsequence in the SDD by finding the locations in the SDD where the subsequence boundary markers appear.

Figure 3:
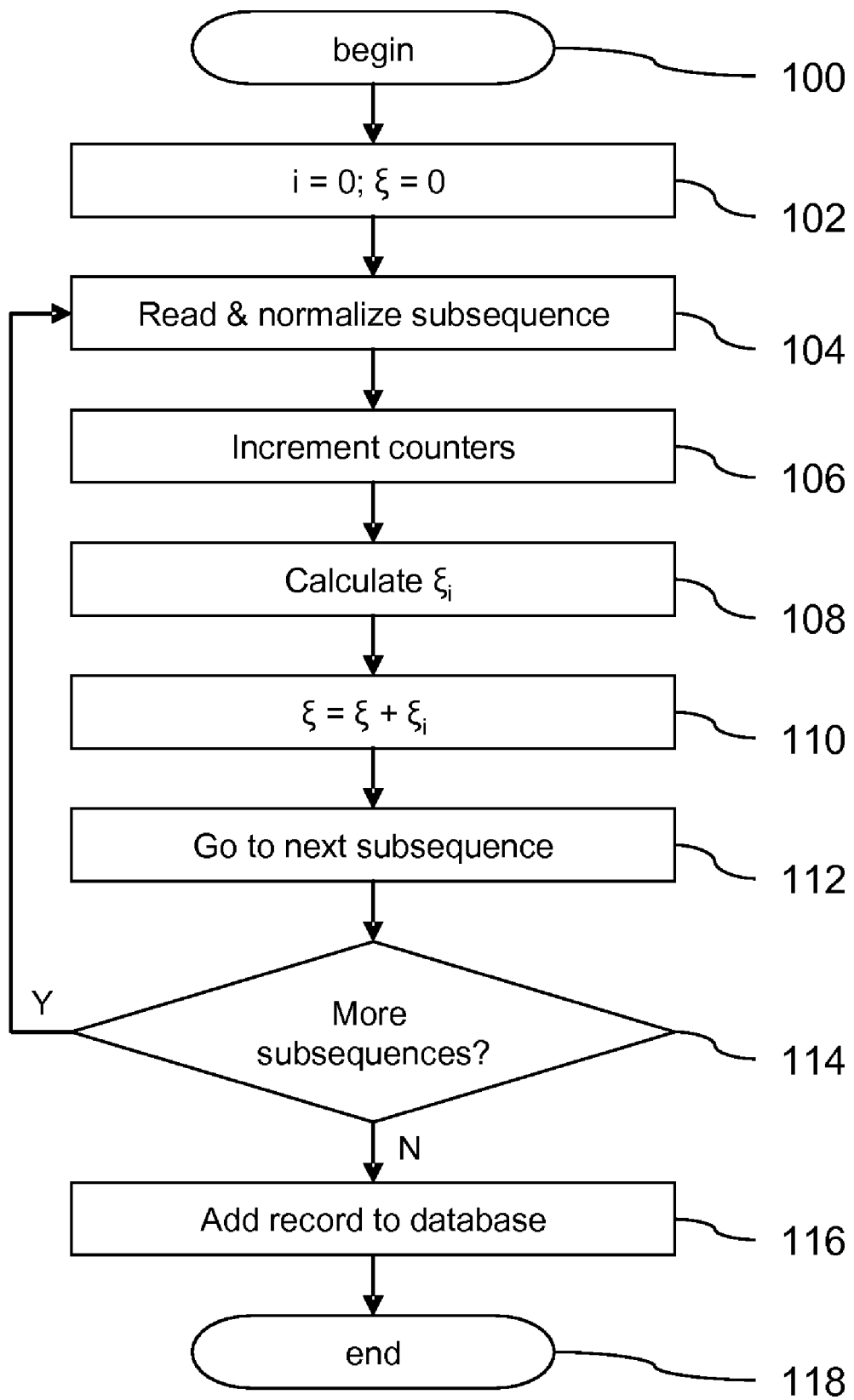
FIG. 3 is a flow diagram illustrating the steps taken by the modules, in FIG. 2, to compute equivalence signatures of a SDD and adding them to a database, according to one embodiment.

In FIG. 3, a request to compute the equivalence signature of a SDD is received 100 by the Signature Generator 1530 which then sets its counter and value for the equivalence signature to zero 102. Secondly, it reads 104 the first normalized subsequence from the subsequence buffer. Third, it increments, 106, the counter by one. Fourth, it calculates 108 the partial equivalence signature for the subsequence by reading the first and last elements of the digital data elements in the subsequence and subtracting the first element from the last to form an intermediate result. The partial equivalence signature for the subsequence is assigned the value of negative one, if the intermediate result is an odd number, or positive one, if the intermediate result is an even number. Fifth, the value of the partial equivalence signature is added to the value of the equivalence signature 110. Sixth, the calculations of 104-110 are performed while looping over the remaining subsequences 112 until the end of the sequence is reached. When no more records are found 114, a new record is added to the Signature Database 1560 with key equal to the value of the equivalence signature and other fields containing the meta data about the SDD that was provided in the request to compute this equivalence signature. Such meta data may include the path or URL to the file containing the SDD, the data and time that the file was last written, the size of the sequence of meta data, a text description of the sequence of meta data, the name of the source or author for the meta data, the policy for the use of the meta data, other signatures or features of the SDD, and the like.

Figure 4:
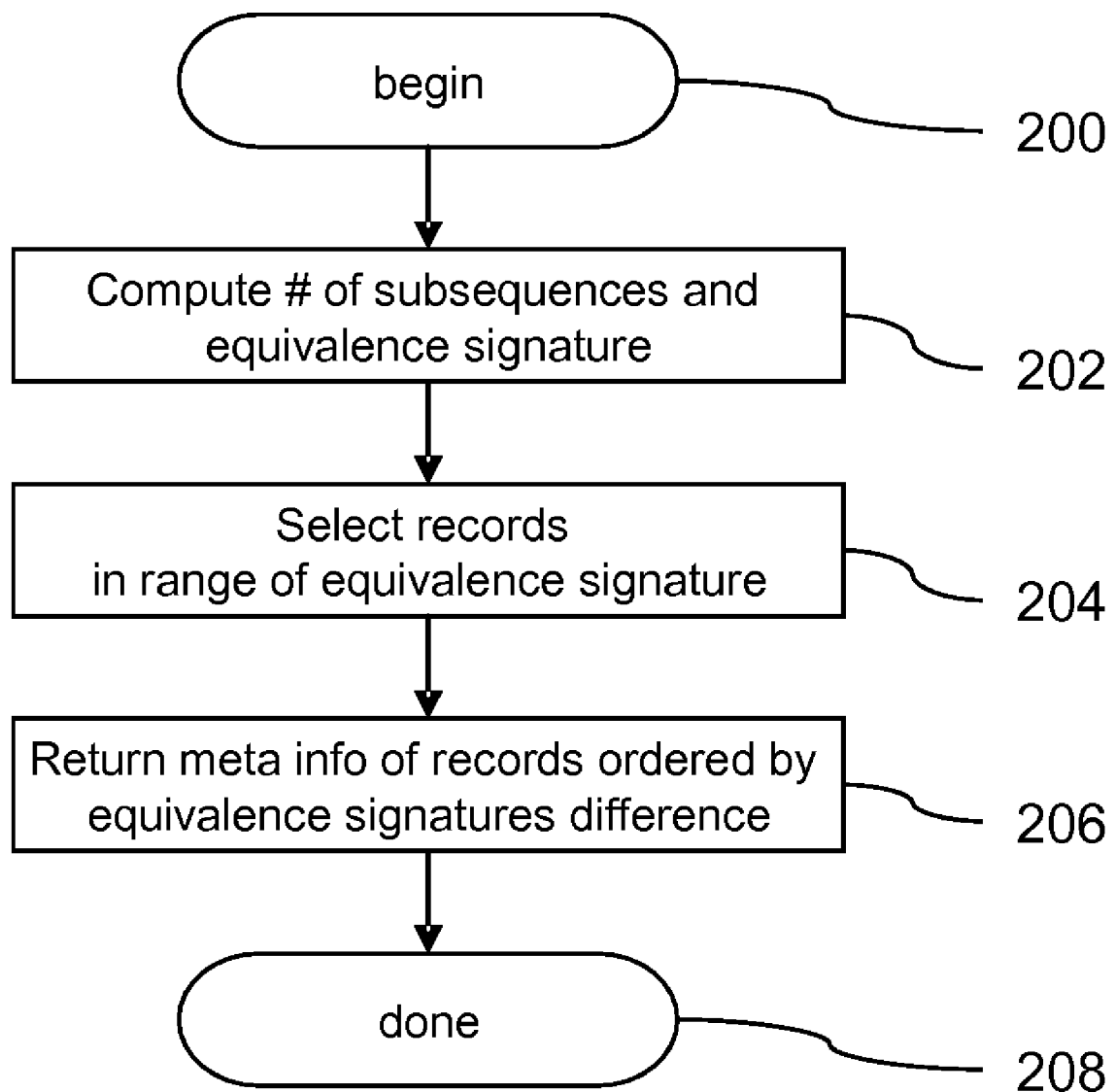
FIG. 4 is a flow diagram illustrating the steps taken by the modules, in FIG. 2, to find other SDDs that are similar to a target SDD, according to one embodiment.

In FIG. 4, a target SDD is provided in a request 200 to the Analysis Manager 1550 to find SDDs, that were previously analyzed and whose equivalence signatures are stored in records of the Signature Database 1560, that are candidates for similarity with the target. To wit, the Analysis Manager 1550 instructs the Data Reader 1510, Data Preprocessor 1520 and Signature Generator 1530 in series to compute 202 the equivalence signature of the target SDD and then reads 204 those records in the Signature Database 1560 for which the key, $\xi$, is within the numerical range of the equivalence signature, $\xi$, of the target, as specified by Eqn. 4. Each similarity distance is computed as $|\xi'-\xi|$. A list of the meta data in the records with keys in the aforementioned range is formed and ordered from smallest to largest value of the similarity distance. The order list is returned by the Analysis Manager 1550 as the meta data of the candidates for the similar SDDs from most similar to least similar. A configuration value can be set so that each similarity distance is returned with each entry in the list.

Figure 5:
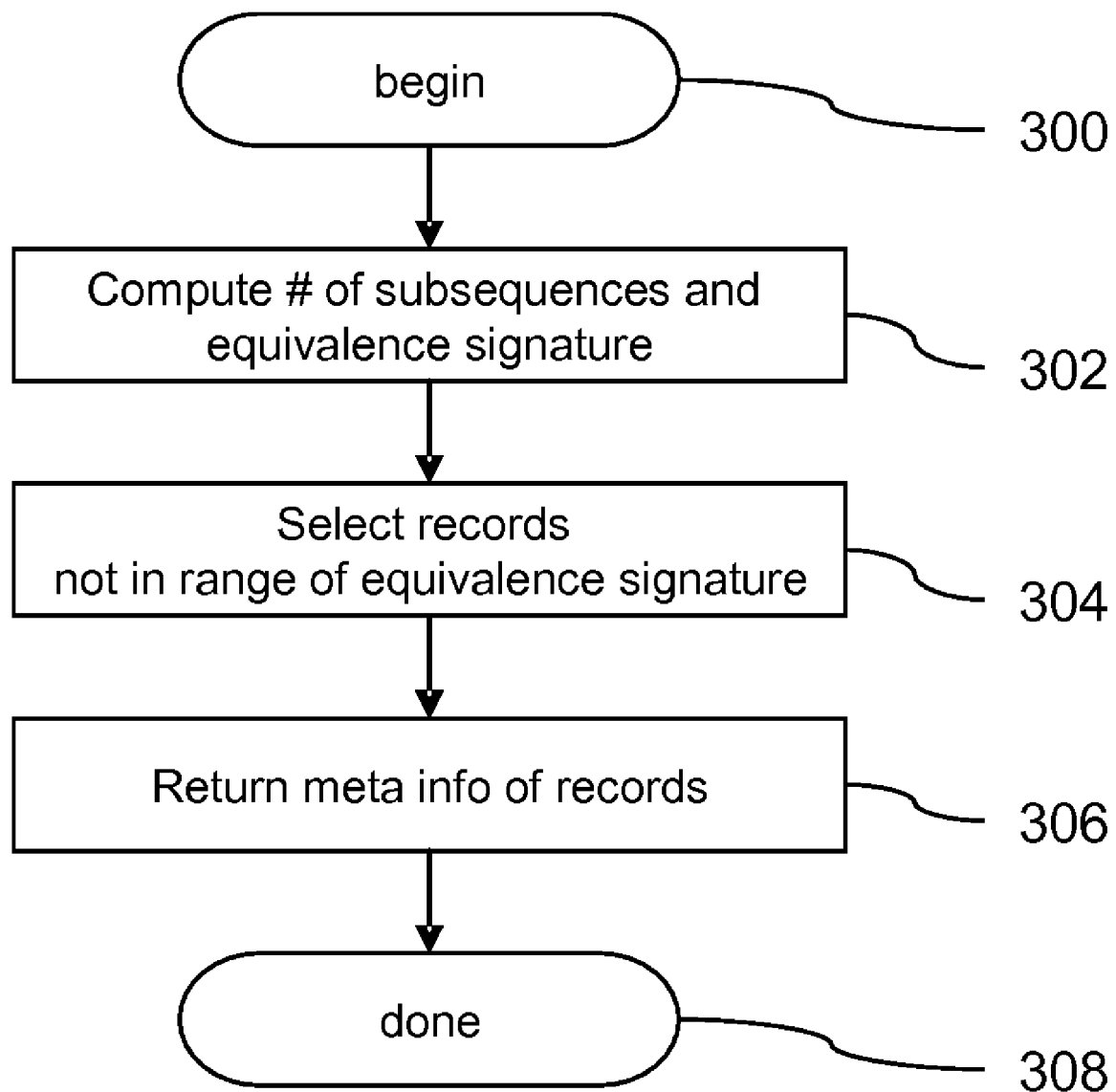
FIG. 5 is a flow diagram illustrating the steps taken by the modules, in FIG. 2, to find other SDDs that are not similar to a target SDD, according to one embodiment.

In FIG. 5, a target SDD is provided in a request 300 to the Analysis Manager 1550 to find SDDs, that were previously analyzed and whose equivalence signatures are stored in records of the Signature Database 1560, that are not similar to the target. To wit, the Analysis Manager 1550 instructs the Data Reader 1510, Data Preprocessor 1520 and Signature Generator 1530 in series to compute 302 the equivalence signature of the target SDD and then reads 304 those records in the Signature Database 1560 for which the key, $\xi$ is outside of the numerical range of the equivalence signature, $\xi$, of the target, as specified by Eqn. 4. A list of the meta data in the records with keys outside of the aforementioned range is formed and returned by the Analysis Manager 1550 as the meta data of the dissimilar SDDs.

Operation—Additional Embodiments-FIG. 2

In a second embodiment, an equivalence signature is computed for a SDD as in 1500 through the pipelined steps: Data Reader 1510→Data Preprocessor 1520→Signature Generator 1530→Signature Database 1560 with the Data Reader 1510, Data Preprocessor 1520, Signature Generator 1530, and Signature Database 1560 performing the same function as in the preferred embodiment except that each module calls the succeeded module in the pipeline upon completion of their computation. In this second embodiment, the Analysis Manager is not invoked.

In a third embodiment, the Data Preprocessor module 1520 finds the start and end of each subsequence in the sequence of digitized audio data by means of previously invented (such as Refs. U.S. Pat. Nos. 4,739,398 and 5,162,905 techniques for detecting subsequences of audio from digital audio streams.

In a fourth embodiment, the Data Preprocessor module 1520 normalizes each audio sample by taking the logarithm of the value of the sample.

In a fifth embodiment, the Data Preprocessor module 1520 finds the start and end of each subsequence in the sequence of digitized text data by finding the locations in the SDD where punctuation or space characters appear, and normalizes the data by reducing all characters to lower or upper case and/or removing stop words and/or reducing words to their stems by means of a word stemmer such as a Porter stemmer [Porter].

In a sixth embodiment, the Data Preprocessor module 1520 finds the start and end of each subsequence in the sequence of digitized audio data by first finding the locations in the sequence of digital audio data where the largest and smallest audio samples, such as pulse code modulated (PCM) values and the like, in the sequence of digital audio data are found using any available min/max determination methods. Next each audio sample in the sequence is normalized by multiplying it by a configured fixed value, the new maximum value, and dividing the result by the largest value. Then the end of a subsequence is set as the location in the sequence where a normalized value is below a configurable threshold or within a configurable proximity of the minimum sample value in the sequence of digital audio data.

In a seventh embodiment, the Data Preprocessor module 1520 finds the start and end of each subsequence in the sequence of binary data by finding the headers of the subsequences composing the data, such as the ELF section headers [ELF], and the like.

CONCLUSION, RAMIFICATIONS, AND SCOPE

Accordingly, the reader will see that the method invented here introduces novel feature of an equivalence signature including that
1. it is computationally inexpensive to compute;
2. it can be directly used to reduce by a factor $$o\left(\frac{1}{N_S}\right).$$

the set of candidate SDDs that are to be further analyzed for similarity by more computationally intensive feature comparison techniques such as U.S. Pat. Nos. 7,031,980; 5,933, 823; 5,442,716 and a similar reduction in the computing cycles and resources needed to find SDDs can be obtained;
3. the size of the equivalence signature is small, no larger than $\log_2 L$ bits, where L is the length of the SDD; for most applications the equivalence signature can be realized as a 32-bit integer, resulting in further computational and memory savings as well as the performance advantages of an in-memory database for the equivalence signatures;
4. the difference between the equivalence signatures of two non-homotopically equivalent SDDs is bounded;
5. SDDs with subsequences in the same homotopy classes will have the same value for the equivalence signature;
6. it is an integer by virtue of the fact [Bott] that $\pi_1(S^1)=Z$.

The present invention has been described by a limited number of embodiments. However, anyone skilled in the art will recognize numerous modifications of the embodiments. It is the intention that the following claims include all modifications that fall within the spirit and scope of the present invention.

What is claimed is:

1. A computer implemented method of querying a database comprising:
   (a) receiving one or more target sequences of digital data into a computer memory, wherein each sequence of digital data (SDD) comprises subsequences;
   (b) computing a numerical similarity signature, referred to as an equivalence signature, for a target SDD;
   (c) computing a fundamental homotopy group's invariant of a subsequence as the difference between the last and first values of said subsequences, wherein homotopy invariants characterize equivalence classes of maps between topological spaces;

(d) reducing the equivalence signature to a sum over the number of subsequences that constitute said target SDD with each summand being positive one (+1) if the value of a fundamental homotopy group's invariant for the values of the elements of a subsequence is even, and negative one (−1) if said value of the fundamental homotopy group's invariant for said values of the elements of said subsequence is odd;

(e) creating a first set of one or more similar sequences of digital data by computing a similarity distance between the computed target equivalence signature and candidate equivalence signatures that were previously stored in a database;

wherein in order for a candidate SDD to be identified as being similar to a target SDD, the absolute value of the difference of their equivalence signatures will either be equal to each other or differ by a predetermined bounded value that is less than the lesser of the two numbers of subsequences in said sequences of digital data; and (f) performing further analysis on said first set of one or more similar sequences, using secondary features and meta data, in order to produce a final set of one or more similar sequences.

2. The method of claim 1, wherein a sequence of digital data includes sequences whose members are represented in a provided memory as real numerical values.

3. The method of claim 1, wherein a sequence of digital data is specified for the computation of an equivalence signature by proving a starting address of said sequence of digital data in a provided memory and the length of the sequence of digital data in said memory.

4. The method of claim 1, wherein the sequences of digital data comprise:

(a) a configurable subsequence separator which is read from an array of configuration values in a memory;

(b) an array of subsequence addresses which is allocated in a memory; and wherein said sequences of digital data are split into subsequences by reading their plurality of elements from said memory, and for each element whose value equals that of said subsequence separator, sequentially recording, in said subsequence address array, the difference between the position of the element before it and the starting address of the last subsequence as the length of the last subsequence and the next element as the beginning of the next subsequence.

5. The method of claim 1, wherein computing an equivalence signature of a sequence of digital data further comprises:

normalizing said sequence of digital data by any of a plurality of methods including linearly resealing and shifting the data of said sequence of digital data to fixed maximum and minimum values found in the database of configuration values after, in the case of text data, removing words, listed in a list of stop words resident in provided memory, from and stemming each word in said sequence of digital data, and the like.

6. A computer implemented method of retrieving data similar to target data comprising:

(a) receiving one or more target sequences of digital data into a provided memory, wherein each sequence of digital data (SDD) comprises subsequences;

(b) computing a numerical similarity signature, referred to as the equivalence signature, for an input sequence of digital data (SDD);

(c) computing a Fundamental Homotopy Group's invariant of a subsequence, as the difference between the last and first values of said subsequence, wherein homotopy invariants characterize equivalence classes of maps between topological spaces;

(d) reducing the equivalence signature to a sum over the subsequences of the number of subsequences that fall into a particular Homotopy class with the sign of said number of subsequences being positive one (+1) if the value of the fundamental Homotopy class is even, and negative one (−1) if said value of the fundamental Homotopy class is odd;

(e) computing a similarity distance between the computed target equivalence signature and candidate equivalence signatures that were previously stored in a database as the absolute value of the difference of their equivalence signatures so that said similarity distance will either be equal or differ by a predetermined bounded value that is less than the lesser of the two numbers of subsequences in said sequences of digital data;

(f) storing the equivalence signature in a field of a record for each of the said input sequences of digital data, if said record is not already present in the database;

(g) querying the database for sequences of digital data that are candidates for similarity with said one or more of the said target sequences of digital data;

(h) eliminating one or more dissimilar candidate sequences of digital data; and (i) performing further analysis on the remaining group of one or more candidate sequences of digital data using secondary features and meta data, in order to produce a final set of one or more similar sequences.

7. The method of claim 6, wherein for each sequence of digital data a record is stored in said database, said record comprises (a) a key whose value is the equivalence signature of a sequence of digital data;

(b) one or more fields including a field storing the value of the storage identifier of the medium wherein said sequence of digital data is stored and optionally other fields containing meta data about said sequence of digital data possibly including the storage reference, such as a universal resource location, for the file containing said sequence of digital data; and (c) one or more fields including secondary feature data, for said sequence of digital data.

8. The method of claim 6, wherein a storage identifier comprises the location of a file containing a sequence of digital data along with the starting position of said data sequence in the file and the length of the sequence.

9. The method of claim 6, further comprises writing a record including assigning a key whose value is the equivalence signature for a sequence of digital data assigned to said record.

10. The method of claim 6, further comprising reading a plurality of records and for each of the records extracting the equivalence signature of a sequence of digital data as the key of the record and extracting the fields, containing secondary features as well as the meta data, including the storage reference, from the record.

11. The method of claim 6, further comprising retrieving, from said database, a plurality of records with key values that are equal to a specified equivalence signature of a sequence of digital data.

12. The method of claim 6, further comprising retrieving from said database a plurality of records with key values that are within a range of equivalence signatures.

13. The method of claim 6, further comprising extracting, from said database, a plurality of records with keys such that
   (a) the absolute values of the numerical differences between these keys and the value of the equivalence signature of a target sequence of digital data is computed; and
   (b) if this absolute difference is less than or equal to a configurable fraction of the number of subsequences in the target sequence of digital data, the sequences of digital data associated with said records constitute the candidates for sequences of digital data that are similar to the target sequence of digital data.

14. The method of claim 6, further comprising returning to a user of the method,
   (a) the difference between the value of an equivalence signature of a target sequence of digital data and the keys returned by said database; and
   (b) the meta data from each field in the records identified by said keys.

15. The method of claim 6, further comprising calculating of and sorting of a list of differences, between the equivalence signature of a target sequence of digital data and the values of the keys of the records of the candidates for similar digital data, from smallest to largest values of said differences along with a means for returning to a user of the method, the meta data from said records ordered by said sorted differences.

16. The method of claim 6, further comprising returning to a caller, a difference, between the equivalence signature of a target sequence of digital data and the key of a record in said database, as the distance from the target sequence of digital data to the sequence of digital data whose meta data is specified in the record.

17. The method of claim 6, further comprising calling said database, using a means for calling, with minimum and maximum values for equivalence signatures and specifying that the values of the meta data in the fields in records with key values larger than said maximum value or smaller than said minimum value, are to be returned as a list, and where the said meta data in each of said records in this list is returned to a user of the method as a list of sequences of digital data that are not similar to the sequence of digital data specified by the user in the request to the method.

18. A system for retrieving search results comprising:
   (a) a means for receiving one or more input sequences of digital data into a provided memory, wherein each sequence of digital data (SDD) comprises subsequences;
   (b) a means for computing a numerical similarity signature, referred to as the equivalence signature, for an input sequence of digital data,
   (c) a means for computing a fundamental homotopy group's invariant of a subsequence as the difference between the last and first values of said subsequence, wherein homotopy invariants characterize equivalence classes of maps between topological spaces;
   (d) a means for reducing the equivalence signature to a sum over the number of subsequences that constitute said target SDD with each summand being positive one (+1) if the value of a fundamental homotopy group's invariant for the values of the elements of a subsequence is even, and negative one (−1) if said value of the fundamental homotopy group's invariant for said values of the elements of said subsequence is odd;
   (e) a means for creating a first set of one or more similar sequences of digital data by computing a similarity distance between the computed target equivalence signature and candidate equivalence signatures that were previously stored in a database,
   wherein in order for a candidate SDD to be identified as being similar to a target SDD, the absolute value of the difference of their equivalence signatures will either be equal or differ by a predetermined bounded value that is less than the lesser of the two numbers of subsequences in said sequences of digital data;
   (e) the persistence of said equivalence signature for said input sequences of digital data by means of a database for storing a record for each of the said input sequences of digital data, if said record is not already present in the database and the database is configured to store said records;
   (f) a means for querying the database for sequences of digital data that are candidates for similarity with said one or more of the said input target sequences of digital data; and
   (g) a means to create a final set of one or more similar sequences of data by comparing a set of secondary features provided with a target sequence of digital data against the secondary features for similar candidate sequences of digital data whose records are in said database.

19. The method of claim 18, further comprising a means for retrieving, from said database, records with key values that are within a range of equivalence signatures, said range having a lower bound given by the value of the equivalence signature of said target sequence of digital data minus the number of subsequences that are allowed to be different and an upper bound given by the value of the equivalence signature of said target sequence of digital data plus the number of subsequences that are allowed to be different.

20. The method of claim 18, further comprising the comparison, of said set of secondary features provided with said target sequence of digital data, against the secondary features for said similar sequences of digital data found by querying the database and returning the list produced by the comparison of the secondary features as the final list of sequences of digital data that are similar to said target sequence of digital data.

* * * * *